INVENTORS
Frank D. Lonadier
Willard B. Brown
Fred C. Fushimi
Gary L. Silver

United States Patent Office 3,438,749
Patented Apr. 15, 1969

3,438,749
ION EXCHANGE METHOD FOR PREPARING
METAL OXIDE MICROSPHERES
Frank D. Lonadier, Miamisburg, and Willard B. Brown
and Fred C. Fushimi, Dayton, and Gary L. Silver,
Centerville, Ohio, assignors to the United States of
America as represented by the United States Atomic
Energy Commission
Filed Oct. 25, 1966, Ser. No. 589,467
Int. Cl. C01g 56/00
U.S. Cl. 23—344          7 Claims

ABSTRACT OF THE DISCLOSURE

A process for the preparation of metal oxide microparticles comprising absorbing metal cations in an ion exchange resin and burning away the resinous portion leaving metal oxide microparticles as residue.

---

This invention relates to metal oxide microparticles or microspheres, and more particularly to the preparation of plutonium oxide microspheres using ion exchange resins.

A great deal of attention has been given recently to the preparation of plutonium or other radioelement microspheres for use as fuel for nuclear reactors and for use in radioisotopic heat sources. There have been problems in the manufacture of such microspheres in such areas as size, surface uniformity, and crush strength. Plutonium dioxide spheres made by processes heretofore have been characterized by irregularity and nonuniformity in size, surface configuration and crush strength. Microspheres made according to the process described and claimed herein are not subject to such deficiencies, but rather they are characterized by general uniformity of size and of crush strength and they have a generally regular surface configuration. The spheres are thus highly suitable for use as reactor fuels.

The process described herein has also been found to be suitable for the preparation of oxide particles of various other metals. The metal oxide spheres, upon being reduced with hydrogen, may be useful for such purposes as the preparation of catalyst beds for gas reaction chambers. Because the microspheres which result from the method and apparatus described herein are small, round, and of uniform size, they may be ideally suited for use in a catalyst bed to provide a maximum surface area in a minimum amount of space.

It is an object of this invention to provide a novel method for making metal oxide spheres.

It is another object of this invention to provide plutonium dioxide spheres of generally uniform size and crush strength.

It is another object of this invention to provide a novel method for making plutonium dioxide spheres by using cation exchange resins.

This specification, including the description, drawing, and claims, has been prepared in accordance with the applicable patent laws and the rules promulgated under the authority thereof.

By this process ion exchange resins may be partially or completely saturated with metal ions by equilibrating with solutions of metal salts. It has been determined that anion exchange resins are not satisfactory because they will not suitably react with metal cations in solution. The use of organic cation resins, on the other hand, appears to produce highly acceptable microspheres. The size, hardness, and density of the spheres may be varied by controlling the conditions of resin loading and ignition as discussed infra.

A plutonium compound, such as plutonium dioxide, $PuO_2$, may be reacted with an acid, such as nitric acid, to form a salt. This reaction produces plutonium nitrate salt according to the following equation:

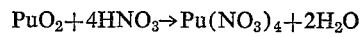

$$PuO_2 + 4HNO_3 \rightarrow Pu(NO_3)_4 + 2H_2O$$

The plutonium nitrate salt thus produced may be added, in an acid solution of about 1 M nitric acid or less, to a dried organic cation exchange resin, such as one of the commercially available Dowex 50 or 50W series, manufactured by Dow Chemical Company, Midland, Mich. The Dowex 50W series was selected because of the relatively high equivalence value per unit weight and because of the availability in several degrees of mesh size and crosslinkage. The Dowex 50 and 50W series are sulfonated hydrocarbon cation exchange resins but other organic cation exchange resins, such as carboxylated or chelated hydrocarbons, may be used.

Figure 1:
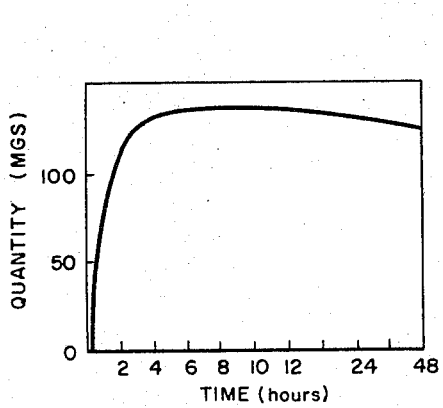
FIG. 1 is a graph showing the quantitative absorption of plutonium by a resin as a function of time.

The absorption of plutonium by cation exchange resins appears to be relatively rapid. Apparent equilibrium may be reached in a few hours, as indicated in FIG. 1. Controlled investigation and experimentation indicates that loading may be complete in about four hours, and that no change in the quantity of the absorbed plutonium is apparent for several more hours. However, the resins appear to gradually release plutonium-238 after about twenty-four hours. This phenomenon may be due to radiation damage to the resins which may result in a decreased capacity for the cationic plutonium. After forty-eight hours the maximum amount lost by the resins appears to not exceed about ten percent of the initially bound plutonium-238. Radioisotopes with long half-lives, such as plutonium-239, are generally not released by the resin.

Resins of eight percent crosslinkage or less appear to be most satisfactory for producing uniform microspheres. Decrepitation, probably resulting from less elastic and less permeable particles, seems to be most severe in particles of high crosslinkage, such as, for example, twelve or sixteen percent. Resins of eight percent crosslinkage or less appear to be best for producing microspheres. However, if the resin is so lightly cross-linked that it will not have sufficient rigidity to maintain its shape, it will not be suitable for microsphere production.

Figure 2:
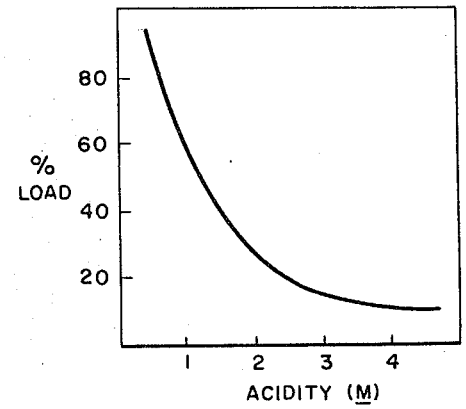
FIG. 2 is a graph showing absorption of plutonium as a function of acidity.

Generally speaking, there are two methods for loading the resin. The first is the plutonium control method. The degree to which the resin is loaded may be controlled by limiting or controlling the quantity of plutonium available to the resin. The second is the acid control method. The degree to which the resin is loaded may be controlled by varying the acidity of the medium from which loading occurs. FIG. 2 shows a typical relationship between resin loading and acidity or hydrogen ion concentration. According to the graph, a loading medium of less than one molar acid concentration provides the highest loading, and the resin loading decreases as the acidity of the medium increases.

Experiments indicate that the microparticles obtained by the acid control method are generally better than those obtained by the plutonium control method. The inferior quality of the plutonium control microparticles may result, at least in part, because the plutonium control method favors the loading of the resin surfaces at the expense of the resin interiors. According to FIG. 2, a one M, or less, acid solution appears to be best for maximum loading of the resin particles.

The resins appear to be loaded principally according to the following expression:

$$Pu^{4+} + 4RH = PuR_4 + 4H^+$$

where

RH = free resin sites and
$PuR_4$ = sites occupied by $Pu^{4+}$

After the loading has been accomplished to the extent of equilibration, the loaded resins may preferably be separated from the solution by an appropriate procedure such as vacuum filtration. The filtered resins may then be dried to remove excess acid and impurities such as moisture.

Experience indicates that the loaded resin particles should preferably be thoroughly dried prior to ignition. Extensive decrepitation of the resin beads occurs, and the metal oxide microspheres remaining after ignition of the beads appear cracked and broken, when the resin particles are not dried prior to ignition. This may be due to the explosive escape of internally generated steam in the resin bead.

It appears that substantially pure plutonium should be used in the formulation of the microspheres. Many transition metals, such as iron and copper, may inhibit or prevent the formulation of satisfactory microspheres by the process disclosed herein.

After the resins are loaded, the plutonium oxide microspheres may be prepared by igniting the plutonium loaded cation resins. The resins may be ignited at a temperature high enough to decompose and volatilize them, leaving only beads, or microspheres of the metal oxide. While temperatures up to about 1200° C. may be used for ignition, a temperature range of from about 900° C. to about 1100° C. appears to be most satisfactory.

Since the properties of crush strength and density are of particular importance for many applications of the microspheres, these parameters have been studied in various ignition tests. Experiments indicate that crush strength and density may be related to both temperature and exposure time. It appears that crush strength may increase with both temperature and period of ignition. Thus it may be concluded that an increase in crush strength results from the gradual sintering of the particles. If further appears that density also increases with ignition temperature. Moreover, density appears to increase as the resin loading increases.

Figure 3:
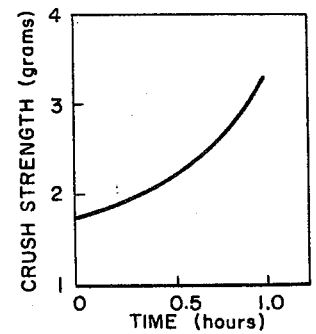
FIG. 3 is a graph showing crush strength as a function of time.
Figure 4:
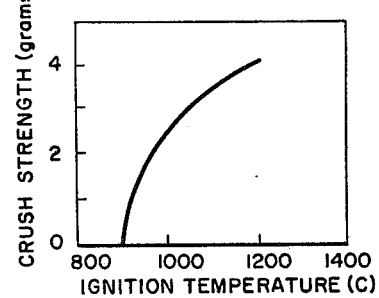
FIG. 4 is a graph showing crush strength as a function of temperature.

FIGURES 3 and 4 plot crush strength in grams as a function of time and temperature, respectively. For FIG. 3, Dowex 50W–X8 resin, loaded to about 90% capacity, was used and ignition was at a temperature of about 1200° C. The graph indicates that crush strength increases at a slightly increasing rate as ignition time increases. Dowex 50W–X4 resin, loaded to about 90% capacity, was ignited for one hour at various temperatures to produce the data which comprises FIG. 4. According to the graph, the crush strength increases at a decreasing rate as the ignition temperature increases.

For the studies and experiments on the properties of the particles, the plutonium loaded cation exchange resins have been ignited in open ceramic boats. The various experiments indicate that a number of generalizations may be made:

(1) At constant loading, density increases with ignition temperature.

(2) At constant loading, size decreases with increase in ignition temperature.

(3) At constant ignition temperature, size increases with loading, but the increase is not necessarily large.

(4) At constant ignition temperature, density increases with loading.

(5) Crush strength increases with ignition temperature and with period of ignition at a given temperature.

(6) Crush strength and density do not seem to be related.

(7) As loading of the resin beads decreases below 50% theoretical, it is increasingly difficult to prepare good oxide microspheres.

The microspheres produced in open ceramic boats have generally not been of uniform quality. That is, they were not all characterized by smoothness of surface, absence of cracking and breakage, and uniformity of size. However, the spheres thus produced were generally consistent, according to the controls of time, temperature, and loading, with respect to density, size, and crush strength. The generalizations set forth above therefore appear to be valid. Various resins of the Dowex 50W type, ranging in size from 14 to 20 mils, produced particles whose size typically was 5 to 7 mils, whose density ranged from 2 to 4 grams per cubic centimeter, and whose crush strength varied from 0 to 5 grams.

Figure 5:
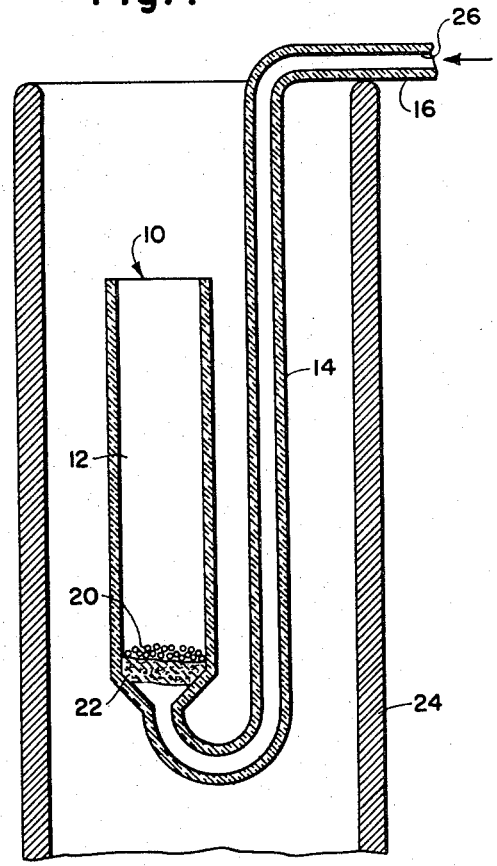
FIG. 5 shows the apparatus used to fire or ignite the loaded resin.

The apparatus shown in FIG. 5 appears to yield microspheres of substantially uniform quality. A quartz sintering tube apparatus 10 may comprise two vertical sections 12 and 14 and a horizontal section 16. The dried resin particles 20 may be placed in the first vertical section or tubular receptacle 12 on a medium or large frit filter 22. The vertical sections 12 and 14 may then be placed in the core of a vertical tube furnace 24. Air may be forced through an inlet 26 into horizontal section 16, vertical section 14 and through frit filter 22. The pore size of the frit may vary from twenty to one hundred microns. The frit should preferably be large enough to permit the gas to flow freely but not sufficiently large so as to permit the loaded resin particles to flow through and out of the tube 10 into the tube 14 or to clog frit filter 22. The air preheated by furnace 24 as it moves through vertical tube 14, provides a substantially uniform atmosphere for the entire mass of particles 20 and causes gentle agitation of the resin beads. The entire apparatus, including the resin particles, may be heated slowly and thus avoid thermal shock to the particles.

The use of the quartz sintering tube allows the combustion of the organic resin to proceed smoothly. The material may be ignited at temperatures between about 900° C. and 1200° C. for about 30 minutes. This combustion process may result in the complete decomposition of the organic resin and in the conversion of the plutonium ions to plutonium oxide. The plutonium oxide spheres thus formed are substantially uniform in size, density, crush strength, and surface quality. Generally the microspheres are about 6 to 7 mils in diameter and their density is about 1.5 grams per cubic centimeter.

For most use applications of the microspheres, uniformity of crush strength is highly desirable. As indicated previously, crush strength appears to be related to ignition temperature in two ways. First, crush strength appears to increase as the ignition temperature increases, and second, crush strength appears to increase as the time of ignition increases. The apparatus and technique herein disclosed produces microspheres of a generally uniform crush strength. By varying the ignition temperature or the time of ignition or by modifying slightly the process techniques, the crush strength of the spheres may be controlled. Thus, while a crush strength of about 10 grams or less may be satisfactory for many applications, spheres of higher crush strength may be prepared. For example, particles of very high crush strength, about 500 grams, may be prepared by heating the plutonium-loaded resin in the absence of air to a temperature above 1000° C. and then drawing hot air through the resin bed causing the particles to incandesce.

The preparation of other metal oxide microparticles from metal loaded resins may be accomplished using similar, if not identical, techniques. However, the metal salt may be a sulfate, such as zirconium sulfate, rather than a nitrate, such as plutonium nitrate. In addition, different resins may be used for loading, equilibration times may vary, and other factors may differ from the technique described for plutonium. On the other hand, the basic process used for plutonium oxide microspheres may be used to provide microspheres of other metal oxides of a quality higher than those commercially available. Oxide particles of zicronium, thorium, cerium, aluminum, lanthanum, and uranium have been prepared by the disclosed process.

It may be seen that the invention dsecribed herein comprises a novel process. Metal oxide microspheres of uniform size and crush strength and generally of a regular surface configuration may be produced in a simplified and less costly manner by the apparatus and method disclosed.

We claim:

1. The method of preparing plutonium dioxide spheres comprising, in combination, the steps of forming a plutonium inorganic salt solution by adding an inorganic plutonium compound to an inorganic acid, loading an organic cation exchange resin by equilibrating the plutonium inorganic salt solution and said organic cation exchange resin, separating the loaded resin from the solution, and igniting the loaded resin in a furnace to remove the resin from the plutonium dioxide.

2. The method of claim 1 in which the plutonium compound is $PuO_2$ and the acid is $HNO_3$ and the salt formed is $Pu(NO_3)_4$.

3. The method of claim 1 in which the resin is separated from the solution by vacuum filtration.

4. The method of claim 1 which includes the step of drying the loaded resin prior to igniting it.

5. The method of claim 4 in which the loaded resin is ignited in a furnace at a temperature of from about 900° C. to about 1200° C.

6. The method of claim 5 which includes the step of passing air through the loaded resin during the ignition thereof.

7. Plutonium dioxide spheres having uniform size, crush strength, and surface configuration produced by the method set forth in claim 1.

References Cited

UNITED STATES PATENTS

| | | | |
|---|---|---|---|
| 3,216,786 | 11/1965 | Corte et al. | 23—338 |
| 3,114,689 | 12/1963 | Cope | 23—344 |
| 2,868,620 | 1/1959 | Garner | 23—344 |
| 2,863,718 | 12/1958 | Overholt et al. | 23—338 |

BENJAMIN R. PADGETT, *Primary Examiner.*

MICHAEL J. McGREAL, *Assistant Examiner.*

U.S. Cl. X.R.

23—338; 264—.5